(12) United States Patent
Odom

(10) Patent No.: US 7,016,942 B1
(45) Date of Patent: Mar. 21, 2006

(54) DYNAMIC HOSTING

(76) Inventor: Gary Odom, 123 NW. 12th Ave., #1332, Portland, OR (US) 97209

( * ) Notice: Subject to any disclaimer, the term of this patent is extended or adjusted under 35 U.S.C. 154(b) by 621 days.

(21) Appl. No.: 10/212,891

(22) Filed: Aug. 5, 2002

(51) Int. Cl.
*G06F 15/16* (2006.01)
(52) U.S. Cl. .......................... 709/212; 710/22
(58) Field of Classification Search ............... 709/212, 709/213, 217, 232; 710/22
See application file for complete search history.

(56) References Cited

U.S. PATENT DOCUMENTS

| | | | | |
|---|---|---|---|---|
| 5,072,374 A | * | 12/1991 | Sexton et al. | 709/208 |
| 5,155,857 A | * | 10/1992 | Kunisaki et al. | 709/223 |
| 5,901,291 A | * | 5/1999 | Feeney et al. | 709/253 |
| 6,003,097 A | * | 12/1999 | Richman et al. | 710/8 |
| 6,775,693 B1 | * | 8/2004 | Adams | 709/213 |
| 6,865,622 B1 | * | 3/2005 | Sethi et al. | 710/22 |

* cited by examiner

*Primary Examiner*—David Y. Eng

(57) ABSTRACT

For client/server network connectivity, clients connect to a server at a predesignated address. With client/server connectivity, if client-to-client communication is required, even for extended duration, the server acts as an intermediary or host—clients communicate with each other through the server. Herein described are processes for altering communications patterns after an initial client-server communications session has been established, specifically data transmission paths, from the nominal client-to-client communication through server intermediary known in the prior art and described foregoing, to a communication pattern of direct client-to-client communication, possibly with one or more clients dynamically assuming a hosting role analogous to that of a server, thus directly communicating with other clients, rather than continuing to use the server in an intervening manner. Further, once direct client-to-client communication commences, continued connectivity to the server used as the original connection point may be superflous. In short, once client-server connectivity is established, clients may communicate directly client-to-client, or dynamically act as hosts for other clients.

28 Claims, 7 Drawing Sheets

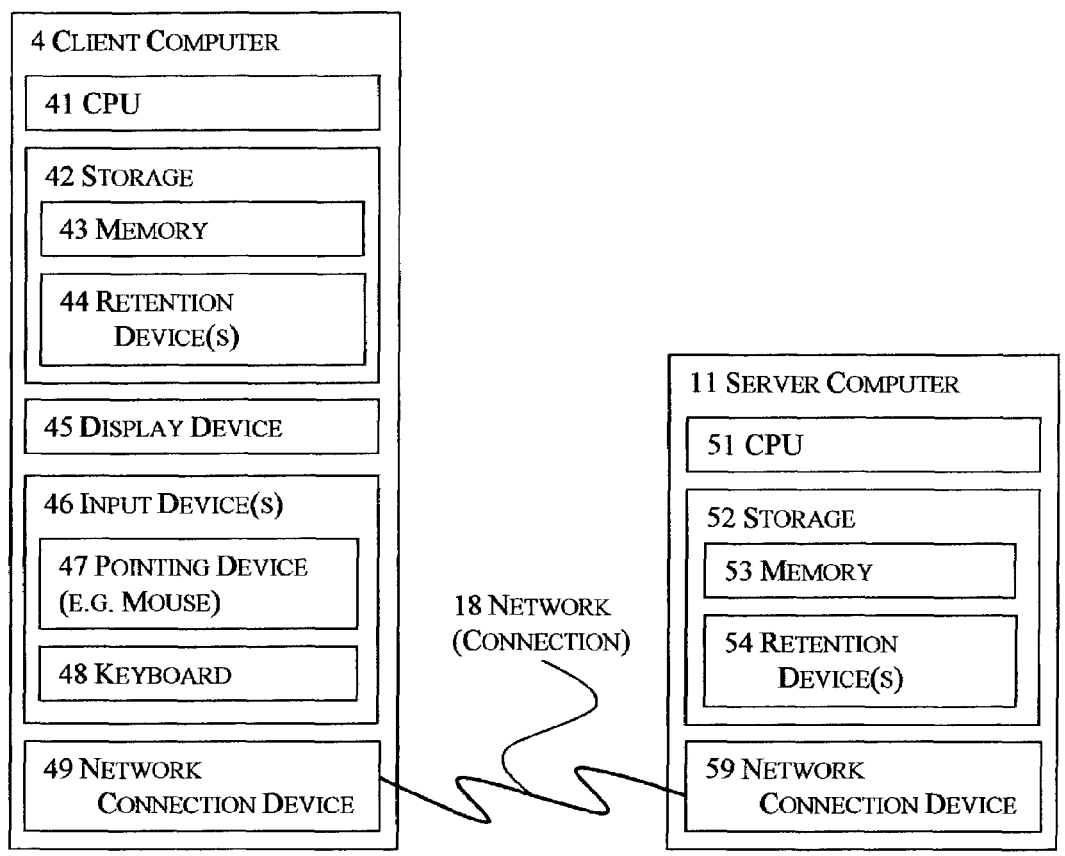
FIGURE 1 : NETWORKED COMPUTERS

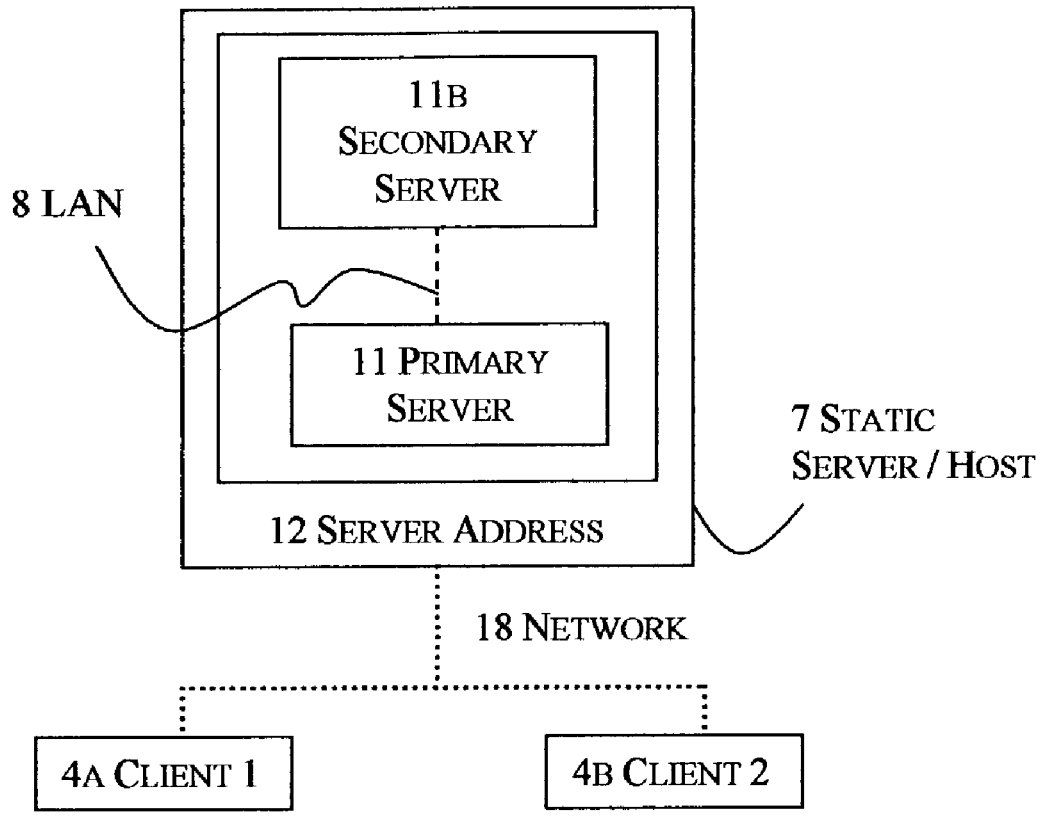
FIGURE 2 : CLIENT-SERVER (PRIOR ART)
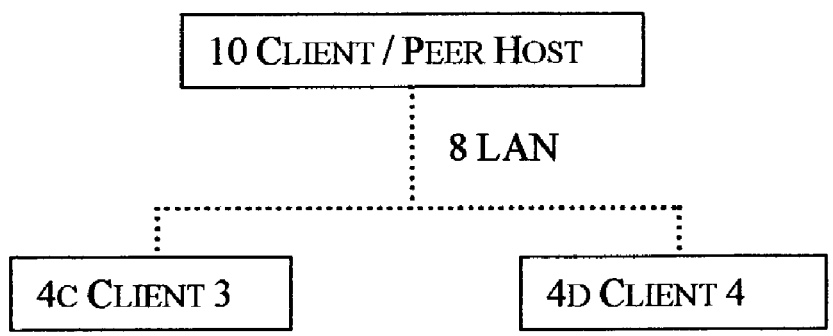
FIGURE 3 : PEER-TO-PEER SERVER (PRIOR ART)

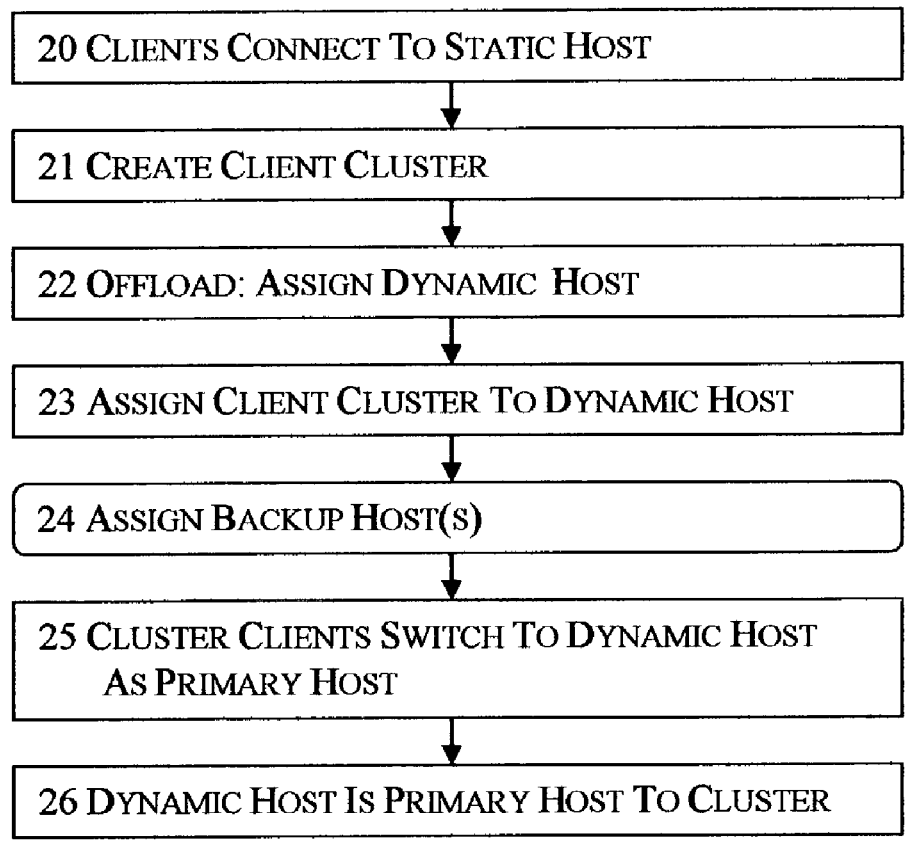
FIGURE 4 : DYNAMIC HOSTING - OFFLOAD METHOD (19)

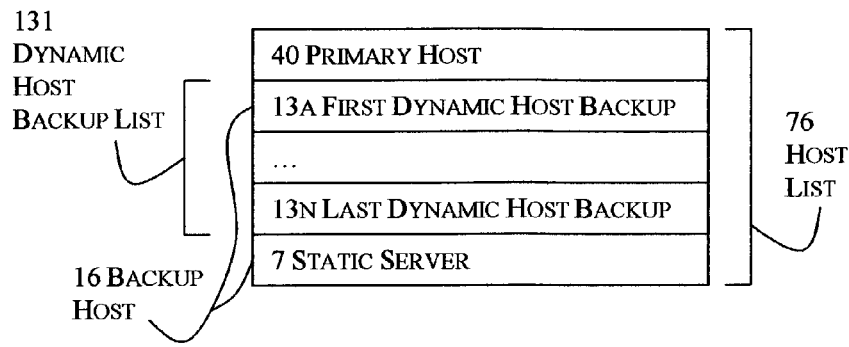
FIGURE 5 : HOST LIST (76)
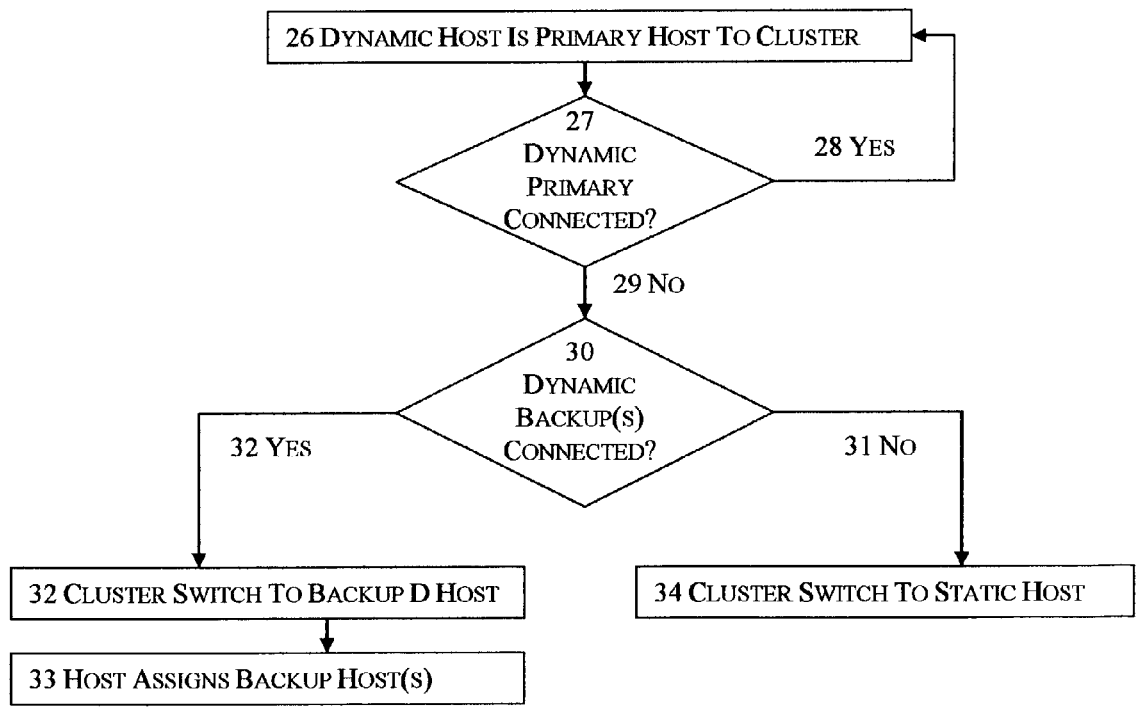
FIGURE 6 : DYNAMIC HOSTING CONNECTIVITY CHECK (35)

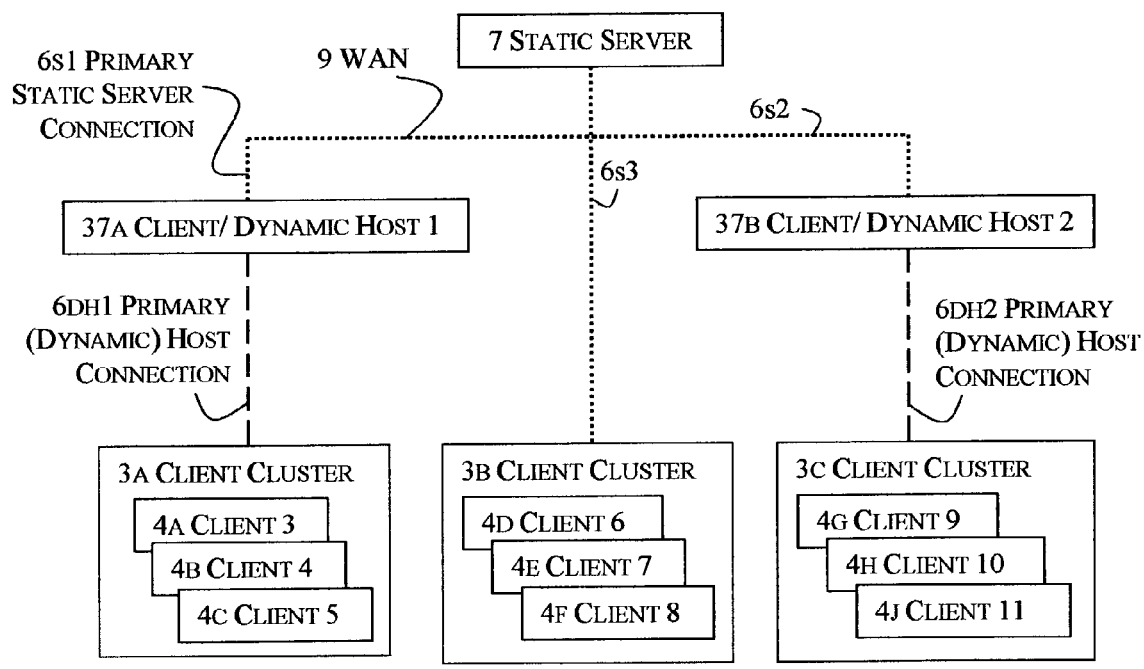
FIGURE 7 : DYNAMIC HOSTING EXAMPLE

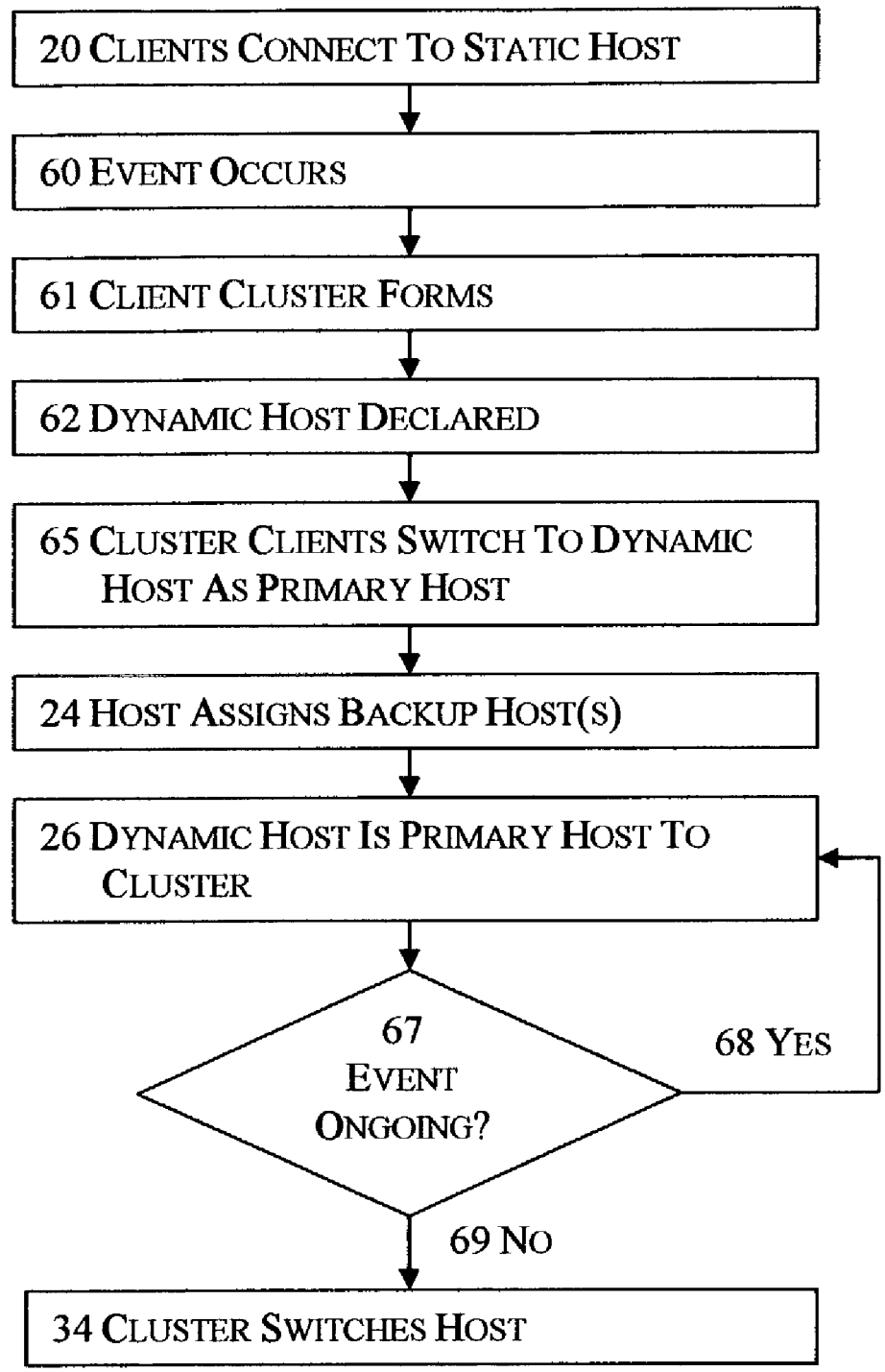
FIGURE 8 : DYNAMIC HOSTING - EVENT METHOD (39)

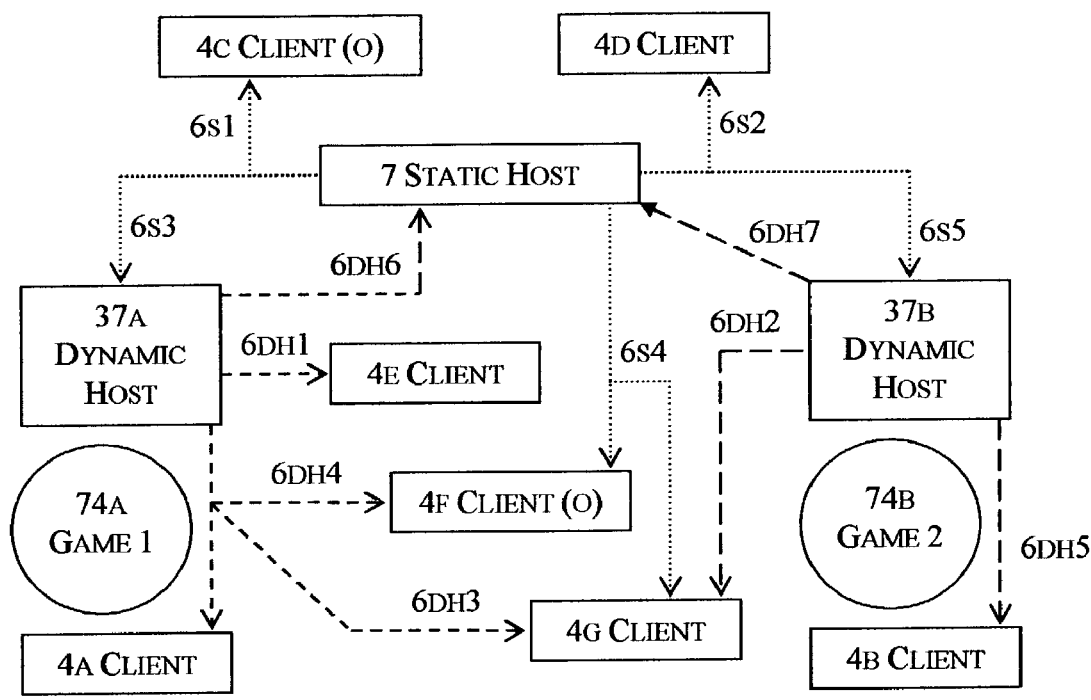
FIGURE 9 : DYNAMIC HOSTING - GAMING EXAMPLE

DYNAMIC HOSTING

TECHNICAL FIELD

The relevant technical field is computer software, specifically, dynamically assigning computer hosts in a client-server networked environment.

BACKGROUND

Personal computers today are typically at least as powerful as servers five years prior, yet in a client-server environment, a client's performance potential remains largely untapped.

With the increasing use of broadband-based connectivity, clients sustain network connectivity indefinitely, as contrasted to short-lived dial-up connections common only a few years ago.

Applications related to group computing have progressed in recent years, but wide-area network implementations of group computing have lacked optimal networking configuration given the aforementioned circumstances relating to performance and network connectivity.

SUMMARY

Dynamic hosting distributes server responsibilities of a cluster of clients to a specific client computer which has been at least temporarily connected to a server. The intent or effect may be to effectively distribute processing resources, facilitate or partition group computing, or simply provide transactional privacy.

One aspect described is temporarily offloading server tasks to specific clients. Another aspect is creating self-sustaining dynamic client-server configurations independent of the server to which clients originally connected.

DRAWINGS

FIG. 1 is a block diagram of suitable computers for deployment of the described technology.

FIG. 2 is a block diagram of a prior art client-server environment.

FIG. 3 is a block diagram of a prior art peer-to-peer environment.

FIG. 4 depicts an embodiment of an offload method for dynamic hosting.

FIG. 5 depicts a host list.

FIG. 6 depicts a dynamic hosting connectivity check.

FIG. 7 is an block diagram of an example of dynamic hosting.

FIG. 8 depicts an embodiment of an event-driven method of dynamic hosting.

FIG. 9 is a block diagram of an exemplary dynamic hosting in an online gaming environment.

DESCRIPTION

FIG. 1 is a block diagram of a client computer 4 connected to a server computer 11 through a network 18. A client computer 4, more simply called a client or computer 4, comprises at least a CPU 41; storage 42, which comprises memory 43 and optionally one or more devices with retention medium(s) 44 such as hard disks, diskettes, compact disks, or tape; an optional display device 45; and optionally one or more input devices 46, examples of which include but are not exclusive to, a keyboard 48, and/or one or more pointing devices 47, such as a mouse. As a client 4 in a network 18, a client 4 has one or more devices 49 for connection to a network.

A server computer 11, more simply called a server 11, comprises at least a CPU 51; storage 52, which comprises memory 53 and optionally one or more devices with retention medium(s) 54 such as hard disks, diskettes, compact disks, or tape; and one or devices 59 for connection to a network.

A network 18 may be any means by which one or more computers 4 are connected to one or more other computers 4 or one or more servers 11 for data transfer. Examples include a local-area network (LAN) 8, or wide-area network (WAN) 9, such as the Internet. Each computer on a network 18 has a designated address. IP addressing has become the norm, though other addressing schemes are known. As known in the prior art, IP addresses may be static or dynamic, depending on how network connectivity is achieved and maintained. Servers 7 almost always have a static address 12. At the least, a server has a pre-designated name address that can be translated to an actual IP (or other protocol) numeric address. Client dial-up connections often involve dynamically allocated addresses, whereas broadband DSL and cable connection commonly, though not always, provide a stable address to clients 4.

As depicted in FIG. 2, a client-server environment is a setup where one or more clients 4 connect to one or more servers 11 through a network 18. A client 4 in a client-server environment primarily receives data from a server 11, or uses the server 11 as a conduit for data transfer with other clients 4. A server 11 primarily transmits data to one or more clients 4, or serves as a hub conduit between clients 4. A server 11 acts as a static server 7 to connecting clients 4.

A server 11 may have a backup 11b. A transition from main server 11 to backup 11b may be transparent to a network-connected client 4, as the client 4 relies upon whatever computer 7 transacts at the given address 12. In the prior art, the server 11 always acts as host 7; a backup server 11b may kick in replace the primary server 11 or to handle additional load at the same address 12, but at no time does a client 4 dynamically usurp the role of the server 11 as host 37 to other clients 4.

As depicted in FIG. 3, a peer-to-peer environment is a setup wherein one or more computers 4 are connected to one another through a network 18 for sharing data without a hosting server 11. Local area networks 8 of personal computers 4 are often peer-to-peer networks nowadays. Without a designated server 11 serving as a conduit hub, a peer may assume the role of acting host 10 from time to time, becoming in effect a server. A scenario of peer-host 10 is common in peer-to-peer games on a local area network 8: typically, a peer host 10 is the computer that initiates game play, in effect becoming a server, whereupon other participating clients 4 join. In the prior art, the initially designated peer host 10 acting as server is static, remaining in that role for the duration of the designated game. In essence, a peer-to-peer configuration temporarily transforms to a prior art client-server configuration.

Dynamic hosting 37 is a method where a computer connects through a network 18 as a client 4 to a static server 7, where there are also other clients 4 connected (to the server 7), and, after some duration, for whatever reason, that client computer 4 begins acting as a host 37 to one or multiple client computers 3 that previously had relied upon the static server 7.

Two exemplary applications for employing the described revelatory technology are described. The first scenario is herewith referred to as offloading 19, where a static server 7 creates client clusters 3 and assigns them to a dynamic host 37. The second scenario is herewith referred to as event hosting 35, where an event transpires that initiates dynamic hosting 37.

The two exemplary scenarios are distinguished for explanatory purposes. Different aspects or elements of the described exemplary embodiments may be altered or combined to fit requirements. Such permutations and combinations are anticipated.

The cluster of clients 3 served by a dynamic host 37 may be, at least initially, selected by the static server 7. Particularly with event hosting 35, however, the client cluster 3 served by the dynamic host 37 may be self-selecting rather than assigned by the static server 7. A client cluster 3 is a list of clients served at some time by a dynamic host 37.

FIG. 4 depicts an exemplary process of dynamic hosting, that of a static server 7 temporarily offloading 35 server duties to a client 4, the client thus becoming a dynamic host 37.

Begin with multiple clients connecting to a static server 20. One or more sets of connected clients are determined 21. One or more dynamic hosts are assigned by the current host 22. Clustering 21 (or 61) or assigning dynamic host(s) 22 (or 62) may precede one another, depending upon embodiment.

Clustering 21 and dynamic host assignment 22 may be determined in various ways, depending upon the application. Exemplary methods include random assignment, basing upon computer configuration or performance characteristics, type or duration of connection to the static server 7, or level of interactivity with the host. Data necessary to determine dynamic host suitability may be passed from client 4 to host, or derived by transaction between client 4 and host. For example, network connection speed may be determined by timing data exchange between host and client 4. Techniques for gauging aforementioned performance characteristics are well known in the prior art.

One or more client clusters are switched to having the dynamic host as their primary server connection 25. The dynamic host acts as primary server to a set of clients 26.

A client may be switched to a dynamic host 25 by any method, even including the static server 7 passing through messages (addressed to the static server 7) from clients in a cluster 3 to a dynamic host 37 without processing them, but the preferred embodiment is using a host list 76 in client software so that the primary host 40 is the dynamic host 37.

Cluster clients switch to the dynamic host as primary host 25, and the dynamic host begins operating as server to its assigned client cluster 26.

One or more backup hosts 16 may be assigned for a dynamic host 24 using a host list 76. As a dynamic host 37 may drop connection at any time, there should be a way for a dynamic host's client cluster 3 to maintain connection continuity in absence of the primary host 40. The original static server 7 may be the only backup host 16, or there may be a list of backup hosts 76 comprising clients in the cluster 131.

FIG. 5 depicts an exemplary embodiment of a prioritized host list 76. The primary host 40 may be the static server 7, but hosting is done by a dynamic host 37 during dynamic hosting 35. In the nominal embodiment, the primary host 40 is the current host, static or dynamic. In an embodiment using a host list 76, a client 3 may know it has a dynamic host 37 by comparing the address of the static server 7 to the primary host 40. There may be a backup dynamic host list 131 in a host list 76, with the static server 7 and possibly a backup static server 11b in the host list 76 as well. FIG. 5 shows exemplary backup hosts 16 by indicating the first dynamic host backup 13a and static server 7.

FIG. 6 depicts an exemplary method of dynamic hosting connectivity check 35 using a host list 76. Clustered clients 3 being hosted dynamically check connectivity 27 by any method known; a lack-of-response time-out (perhaps with repeated checks) is typical. If connectivity with the primary dynamic host is lost 29, clients check connectivity to the next possible dynamic host 131 in the host list 30, repeating this step down the list of possible dynamic hosts 131 until connectivity is established 32, in which case clients switch to the backup dynamic host 32, making it their new primary host 40 (and revising the dynamic backup list 33 accordingly); failing that, a switch is made back to a static server 34.

A client cluster 3 may be dynamic, as may the list of dynamic backup hosts 131; in fact, both likely so, depending upon embodiment.

FIG. 7 depicts an example of dynamic hosting. Two dynamic hosts (37a, 37b) are depicted as operating. A static server 7 continues hosting a client cluster 3b through a primary server connection 6s3, and continues with direct network transactions with dynamic hosts (37a, 37b) through primary server connections (6s1, 6s2 respectively). Two client clusters (3a, 3c) formerly hosted by the static server 7 are currently hosted by dynamic hosts (37a, 37b) through dynamic primary server connections (6dh1, 6dh2). Backup hosts 16 are not depicted in FIG. 7, but may be employed as previously described.

Depending upon circumstance and embodiment, information that needs to flow from the static server 7 to one or more clients 4 served by a dynamic host 37 may now flow through that dynamic host 37 rather than directly from static server 7 to client 4. Dynamic hosting does not necessarily obviate peer-to-peer transactions, but server functions to a designated client cluster 3 are provided by the appropriate host, dynamic 37 or static 7.

FIG. 8 depicts an exemplary process of an event precipitating dynamic hosting. After one or more clients connect to a static server 20, an event occurs triggering dynamic hosting 60. A client cluster forms 61 and a dynamic host declared by the current host 62. Cluster clients switch to the dynamic host 65. The dynamic host acts as primary host 26, at least for data exchange relevant to the event precipitating the dynamic hosting. Once the event concludes, the cluster switches host 34 appropriately.

For example, event hosting 39 may be employed with online (network) gaming, where clients 4 meet via a designated server 7 address 12 to chat (text or voice or video messages), play games, and observe games being played or broadcast by a host. A static server 7 provides a meeting place for participants. Once players match up for a game, event-driven dynamic hosting 35 transpires. One of the players is designated dynamic host 62. For a two-player game, game move transactions are pretty much equivalent to peer-to-peer data exchanges, but dynamic hosting 37 still applies to game observers, as well as whatever information that normally emanates from the host. For multiple-player games, a player may transmit a move to the dynamic host 37, who broadcasts the move to other players 3, thus maintaining synchronization. Likewise, observers of the game, including the static server 7 (who may broadcast that the game is being played), may served by the dynamic host 37 with moves of the game. The dynamic host 37 may also act as server for chat. Dynamic hosting 35 continues as long as the game continues. If, in a multiple player game, the player hosting 37 drops out of the game while the game is still ongoing, becoming (at best) an observer, perhaps thus increasing the risk of disconnection by that dynamic host 37 (losers don't always hang around), dynamic hosting continues with another player hosting. In such an instance, if software can determine the leader in a game (usually by having the lead in accumulation of whatever is important in the game), it may be sensible to use that player as dynamic host 37 (other criteria being non-determinative), as that player may be considered least likely to drop out.

FIG. 9 depicts an exemplary embodiment of dynamic hosting in an online gaming environment. In the example depicted in FIG. 9, the game is a two-player game, such as go, chess, or backgammon. A static server 7 provides a meeting point for client 4 participants using an online gaming application.

As depicted in FIG. 9, the client application lets a participant (user) set whether s/he is open to game match offers or not. In FIG. 9, (o) designates being open to game offers. So, as depicted, users of clients 4c and 4f are open to game matches, while users of client application 4e and 4g are not open to game match offers. Two games (74a, 74b) are in progress. As depicted in FIG. 9, the client application does not allow game players (37a, 4a, 37b, 4b) to observe games while playing. A non-playing participant may observe multiple games, as depicted by one client 4g. A non-playing participant may also observe a game and as well be open to game match offers, as with one depicted client 4f.

Continuing with the example depicted in FIG. 9, when a game match is made, the player taking first move becomes a dynamic host 37. The dynamic host 37 acts as server for receiving game moves from the other player and transmitting all game moves to game observers. For example, dynamic host 37 exchanges moves with client 4a, and serves observers 4e, 4f, 4g, and the static server 7.

The static server 7 in the example depicted in FIG. 9 is a client 4 to the dynamic host 37 for a game being played, keeping track of game status for broadcast to non-observers of the game; non-observers who may choose to observe games in progress, and thus be served by the dynamic host 37 of a game. The static server 7 in the example depicted in FIG. 9 receives game moves comprising move number and move location, but only broadcasts to non-observers of a game the move number (as well as the game players), so as to convey status.

As in the example depicted in FIG. 9, a client 4f observing a game 74a and open to game offers is served by the appropriate dynamic host 37a for the game being observed, and the static server 7 for other information (such as game offers). Likewise, a client 4g watching two games is served by two dynamic hosts (37a, 37b) for game moves, and the static server 7 for other information.

One advantage of the example embodiment depicted in FIG. 9 is that game playing and observation may proceed if connection to the static server 7 is interrupted or lost. In the prior art, with a single static server 7, the entire online gaming environment is disrupted if the static server 7 loses connectivity to the network 18.

In an advanced embodiment, a dynamic host 37 may create other dynamic hosts 37. Consider the example depicted in FIG. 9. If a game 74a had a lot of observers, the other player 4a may become a dynamic host 37 for broadcasting moves to a subset of observers, in which case observers would be hosted either by the original dynamic host 37a, or the newly designated dynamic host 4a. There would be a rule-based trigger to enlist (an) additional dynamic host(s). As an example of a load-shifting rule, the first dynamic host 37a may serve up to 20 observers, after which the other player acts as dynamic host to the next twenty observers, alternately, perhaps up to a limit (say, 100 players), after which the static server 7 may act as host for all other newcomer observers. Alternately, one or more observers 4 may be assigned as a dynamic host 37 to other game observers based upon some load-shifting rule. Obviously, in the example described, the software necessary for dynamic hosting is resident in every copy of client software.

Other exemplary applications readily envisioned include file sharing, conferencing, and other group activities that may be facilitated through networked computer interaction. In these scenarios, a pre-designated static server 7 serves as an initial hub. Participants form a cluster 3 from which one participant hosts 37 for all or part of the event's duration.

For example, a static server 7 provides an initial meeting address for a scheduled conference (video, audio, graphic and/or text data transmissions). The list of participants may be pre-arranged, such as for a business conference. The first of the scheduled participants connects to the server 7 and becomes dynamic host 37. Alternately, a dynamic host 37 may be prearranged, with dynamic hosting beginning only after the dynamic host 37 has connected. Participants are routed by the static server 7 to the dynamic host 37; this may be as simple as setting the primary host 40 in the host list 76 of participants to the appropriate dynamic host 37. A functioning host list 76, perhaps using the list of participants as the backup dynamic host list 131, is recommended. For example, in a conference, the dynamic host 37 (current primary host 40) may have to leave, necessitating transfer to another host 40; another dynamic host 37 can be found in the backup dynamic host list 131, thus becoming primary host 40. FIG. 7 might depict an example of two conferences ongoing with dynamic hosts 37 (37a, 37b), where one cluster 3b is waiting for their conference to begin.

Security may be an issue for some applications, such as conferencing. Participants may be knowingly limited to a list kept by either the static server 7 or dynamic host 37. The backup dynamic host list 131 may comprise the list of participants. Encryption may be applied to transmissions between a dynamic host 37 and participants. Encryption technology is well known in the art, and techniques as to its derivation and application continue to evolve. Once dynamic hosting begins, conference participants may exchange data only between themselves using the dynamic host 37 as server without that data being transmitted to the static server 7.

Optionally, upon the instigation of dynamic hosting, connection with the static server 7 may be terminated by dynamic host 37 and dynamically hosted clients 3. In this embodiment, the original static server 7 works as an initial meeting point from which independent dynamically-hosted configurations arise.

The following is claimed:

1. A computer-implemented method for channeling data through a network from an initial client/server-based connectivity to direct client-to-client communication comprising the following steps:

a first client computer and at least a second client computer connecting through a network to a static server at a pre-designated address, wherein said first client computer and said second client computer are not communicating with each other prior to connecting to said static server;

said first and second client computers respectively establishing a communications session with said static server by exchanging a first data with said server;

designating in a list a plurality of client computers as a client cluster, wherein providing information in said client cluster list allowing establishing a communications session of direct communication between at least two computers on said client cluster list, while said first client computer maintaining said communications session with said static server, said first client computer directly transmitting a second data to at least said second client computer without said static server intervening.

2. The method according to claim 1, wherein said static server not receiving said second data.

3. The method according to claim 2, with the additional step of encrypting said second data.

4. The method according to claim 1, wherein a conditional event precipitates said first computer directly transmitting said second data.

5. The method according to claim 1, whereby said first computer transmitting a third data to said second computer after said second computer loses network connectivity to said static server while maintaining connectivity with said first computer.

6. The method according to claim 1, wherein said client cluster list comprises at least in part at least one network address.

7. The method according to claim 1, with the additional step of said first computer receiving said list from said static server.

8. The method according to claim 7, with the following additional steps:
a third computer connecting to said static server;
wherein said third computer not communicating with said first computer prior to connecting to said static server;
said first computer recognizing said third computer as being on said list;
said third computer losing connectivity to said static server while maintaining connectivity to said first computer.

9. The method according to claim 1, with the following additional steps:
a third computer connecting to said static server,
said static server recognizing said third computer as being on said list;
said third computer transmitting a third data to said first computer without said static server receiving said third data.

10. The method according to claim 1, wherein said list is not created by said static server.

11. The method according to claim 1, with the additional step of prioritizing said list.

12. The method according to claim 1,
wherein said client cluster list designates at least said first said second client computers;
distributing said client cluster list to at least said first client computer.

13. A computer-implemented method for channeling data through a network from an initial client/server connectivity to direct client-to-client communication comprising the following steps:
at least a first and second client computers connecting through a network to a static server at a pre-designated address,
thereby respectively establishing a communications session with said static server, wherein said first client computer and said second client computer not communicating with each other prior to respectively establishing said communications session with said static server;
said first computer transmitting a first data to said second computer via said static server;
while said first computer maintaining network connectivity to said static server,
said first computer directly transmitting a second data to said second computer without said static server intervening.

14. The method according to claim 13, with the following additional steps:
a third client computer connecting to said static server after said first and second computers,
wherein said third client computer and said first client computer not communicating with each other prior to said third computer connecting to said static server;
said first client directly transmitting at least a portion of said second data to said third client computer without said static server receiving said transmission.

15. The method according to claim 13, wherein a conditional event precipitates transmitting said second data.

16. The method according to claim 13, with the additional step of said second computer maintaining connectivity to said first computer while losing connectivity with said static server.

17. The method according to claim 16, with the following additional steps:
said second computer transmitting a third data to said first computer after losing connectivity with said static server;
said first computer transmitting at least a portion of said third data to said static server.

18. A computer-implemented method for channeling data through a network from an initial client/server-based connectivity to direct client-to-client communication comprising the following steps:
at least a first and second client computers connecting through a network to a static server at a pre-designated address,
thereby respectively establishing a communications session with said static server,
wherein said first and said second client computers not communicating with each other prior to respectively establishing said communications session with said static server;
said static server transmitting to said first computer a list comprising, at least in part, a plurality of computers;
said second computer transmitting a first data directly to said first computer without transmitting said first data to said static server;
said first computer transmitting at least a portion of said first data to at least one computer on said list other than said second computer.

19. The method according to claim 18, with the additional step of said first computer not transmitting said first data to said static server.

20. The method according to claim 18, with the additional step of encrypting said first data.

21. The method according to claim 18 with the following additional steps:
said second computer losing network connectivity with said static server while maintaining connectivity with said first computer;
said second computer transmitting a second data to said first computer.

22. The method according to claim 18, wherein a conditional event precipitates said static server transmitting to said first computer said list.

23. The method according to claim 18, with the following additional steps:
   said first computer transferring said list to said second computer,
   wherein said list comprising at least in part the current connected network address of a third computer;
   said first computer losing connectivity to said second computer;
   said second computer transmitting data directly to at said third computer without another computer intervening.

24. The method according to claim 18, with the additional step of said first computer losing connectivity to said static server while maintaining connectivity to said second computer.

25. The method according to claim 18, with the additional step of said first computer transmitting at least a portion of said list to at least one other computer on said list.

26. The method according to claim 18,
   wherein at least one computer on said list, aside from said first computer, being currently connected to said static server.

27. A computer-implemented method for channeling data through a network from initial client/server-based connectivity to direct client-to-client communication comprising the following steps:
   at least a first and second computers connecting through a network to a static server at a pre-designated address,
   wherein said first and second client computers not directly communicating with each other prior to connecting to said static server;
   said static server evaluating at least one operational characteristic of said first computer,
   whereby said static server selecting said first computer as a dynamic host;
   said first computer directly transmitting a first data to said second computer without said static server intervening.

28. The method according to claim 27,
   wherein said evaluation comprises a least in part comparing at least one said operational characteristic between said first and said second computers.

* * * * *